US011614178B2

(12) United States Patent
Matalon et al.

(10) Patent No.: US 11,614,178 B2
(45) Date of Patent: Mar. 28, 2023

(54) DIAPHRAGM ASSEMBLY

(71) Applicant: ITT MANUFACTURING ENTERPRISES LLC, Wilmington, DE (US)

(72) Inventors: Louis E. Matalon, Lancaster, PA (US); Richard Kovacs, Lancaster, PA (US); David Lindt, Lancaster, PA (US); Michael D. Yoder, Quarryville, PA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

(21) Appl. No.: 17/431,801

(22) PCT Filed: Feb. 20, 2019

(86) PCT No.: PCT/US2019/018734
§ 371 (c)(1),
(2) Date: Aug. 18, 2021

(87) PCT Pub. No.: WO2020/171806
PCT Pub. Date: Aug. 27, 2020

(65) Prior Publication Data
US 2022/0128161 A1    Apr. 28, 2022

(51) Int. Cl.
*F16K 7/12*    (2006.01)
*F16K 27/02*    (2006.01)

(52) U.S. Cl.
CPC .......... *F16K 27/0236* (2013.01); *F16K 7/126* (2013.01)

(58) Field of Classification Search
CPC . F16K 7/12; F16K 7/123; F16K 7/126; F16K 7/14; F16K 7/16; F16K 7/17;
(Continued)

(56) References Cited

U.S. PATENT DOCUMENTS 2,716,017 A    8/1955  Linker
3,310,280 A *  3/1967  Boteler .................. F16K 7/123
                                                251/331
(Continued)

FOREIGN PATENT DOCUMENTS

BE         484168 A        7/1948
EP      2618033 A1 *       7/2013  ............. F16K 7/126
(Continued)

OTHER PUBLICATIONS

Machine English translation of EP2618033A1 (Year: 2022).*
International Search Report dated Aug. 8, 2019 for corresponding International PCT Application No. PCT/US2019/018734.

*Primary Examiner* — Hailey K. Do
(74) *Attorney, Agent, or Firm* — Carter, DeLuca & Farrell LLP; Bret P. Shapiro

(57) ABSTRACT

Technologies are described for a diaphragm. The diaphragm may comprise a structure. The structure may be a disc shape with a top and bottom side. The top and bottom sides may be circular in outline. The diaphragm may comprise a diaphragm stud at a center point on the top side. The diaphragm stud may be configured to couple with a connector of a bonnet assembly. The diaphragm may comprise a diaphragm bead on the bottom side. The diaphragm bead may be along a first axis. The diaphragm may comprise at least one tab which may extend radially from the structure along at an outer edge of the structure. The at least one tab may engage with a bonnet notch of a bonnet assembly to align the diaphragm to the bonnet assembly.

17 Claims, 7 Drawing Sheets

(58) Field of Classification Search
CPC .. F16K 7/20; F16K 27/0236; Y10T 137/0491; Y10T 137/0497
See application file for complete search history.

(56) References Cited

U.S. PATENT DOCUMENTS

| | | | | |
|---|---|---|---|---|
| 3,631,882 | A * | 1/1972 | White, Jr. | F16K 7/126 251/331 |
| 4,596,268 | A * | 6/1986 | Jonas | F16K 7/126 251/331 |
| 8,708,308 | B2 * | 4/2014 | Sitnikov | F16K 7/126 251/335.2 |
| 9,109,707 | B2 * | 8/2015 | Goulding | F16J 15/10 |
| 9,423,040 | B2 * | 8/2016 | Barrila' | F16K 31/1268 |
| 9,458,948 | B2 * | 10/2016 | Ehmig | F16K 7/126 |
| 10,801,641 | B2 * | 10/2020 | Lodolo | F16K 7/12 |
| 2014/0021392 | A1 | 1/2014 | Matalon | |
| 2015/0354718 | A1 | 12/2015 | Schwetz et al. | |

FOREIGN PATENT DOCUMENTS

| | | | | |
|---|---|---|---|---|
| EP | 3441651 | A1 | 2/2019 | |
| GB | 362084 | A * | 12/1931 | F16K 7/126 |
| WO | 2008034463 | A1 | 3/2008 | |

* cited by examiner

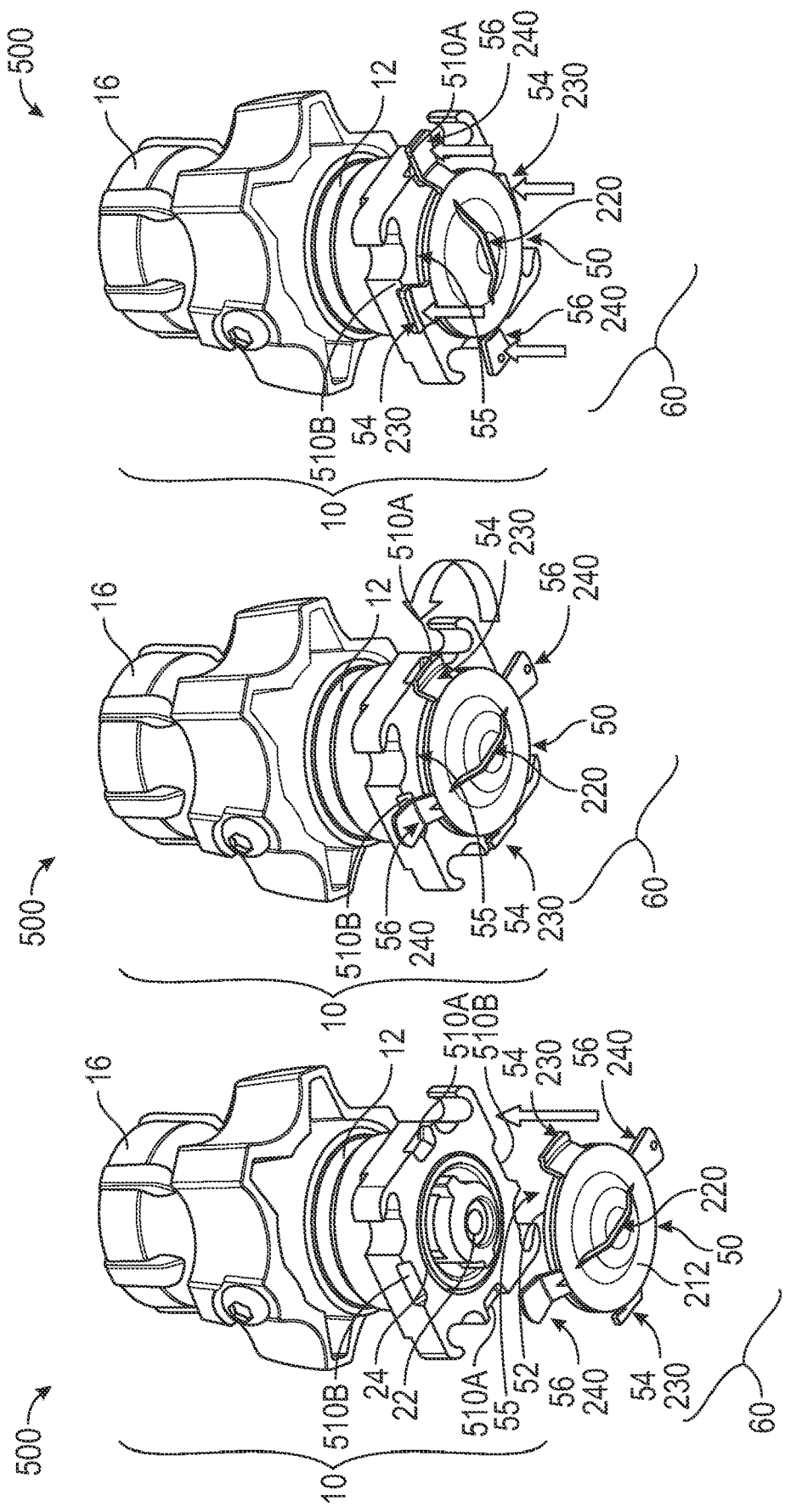

US 11,614,178 B2

DIAPHRAGM ASSEMBLY

This application is related to application serial number PCT/US2019/018736 entitled Keying Structure, and application serial number PCT/US2019/018739 entitled Transition Pressure Ring.

BACKGROUND

Unless otherwise indicated herein, the materials described in this section are not prior art to the claims in this application and are not admitted to be prior art by inclusion in this section.

Diaphragm valves may be comprised of three major subassemblies, the bonnet assembly, the body assembly, and the diaphragm assembly. The bonnet assembly and the body assembly may be held together with a series of fasteners around the periphery of the assemblies. The diaphragm assembly may be positioned in between the bonnet assembly and the body assembly. The bonnet assembly and the body assembly may be separated to inspect and/or replace the diaphragm assembly.

The position of the diaphragm assembly within a diaphragm valve may factor in the function of the diaphragm valve. A diaphragm bead of the diaphragm assembly may line up with a weir of the body assembly when the diaphragm assembly is installed within the diaphragm valve. The diaphragm assembly may be centered through a connection to a valve spindle in the bonnet section.

SUMMARY

One embodiment of the invention is a diaphragm for a diaphragm valve. The diaphragm may comprise a structure. The structure may be a disc shape with a top side and a bottom side. The top side and the bottom side may be circular in outline. The diaphragm may comprise a diaphragm stud at a center point on the top side of the structure. The diaphragm stud may be configured to couple with a connector of a bonnet assembly. The diaphragm may comprise a diaphragm bead on the bottom side of the structure. The diaphragm bead may be along a first axis of the structure. The diaphragm may comprise at least one tab. The tab may extend radially from the structure at an outer edge of the structure. The at least one tab may engage with a bonnet notch of a bonnet assembly to align the diaphragm to the bonnet assembly when the diaphragm is attached to the bonnet assembly.

Another embodiment of the invention includes a method for attaching a diaphragm to a bonnet assembly of a diaphragm valve. The method may comprise inserting a diaphragm stud of a diaphragm through an aperture of a backing cushion. The diaphragm and the backing cushion may comprise a diaphragm assembly. The method may comprise inserting the diaphragm stud into a connector of the bonnet assembly. The method may comprise turning the diaphragm assembly with respect to the bonnet assembly. The turning of the diaphragm assembly may couple the diaphragm stud with the connector of the bonnet assembly. The method may comprise aligning the diaphragm assembly with the bonnet assembly. The method may comprise pressing the diaphragm assembly against the bonnet assembly. At least one tab of the diaphragm may engage with a notch of the bonnet assembly and fix the diaphragm assembly rotationally with respect to the bonnet assembly.

Another embodiment of the invention is a diaphragm for a diaphragm valve. The diaphragm may comprise a structure. The structure may be a disc shape with a top side and a bottom side. The top side and the bottom side may be circular in outline. The diaphragm may comprise a diaphragm stud at a center point on the top side of the structure. The diaphragm stud may be configured to couple with a connector of a bonnet assembly. The diaphragm may comprise a diaphragm bead on the bottom side of the structure. The diaphragm bead may be along an axis of the structure. The diaphragm may comprise tabs. The tabs may extend radially from the structure along the axis of the structure at outer edges of the structure. The tabs and the structure may define one or more diaphragm alignment holes or one or more diaphragm alignment pins. The one or more diaphragm alignment holes may engage with one or more bonnet alignment pins of a bonnet assembly to align the diaphragm to the bonnet assembly when the diaphragm is attached to the bonnet assembly or the one or more diaphragm alignment pins may engage with one or more bonnet alignment orifices of the bonnet assembly to align the diaphragm to the bonnet assembly when the diaphragm is attached to the bonnet assembly.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5, including FIGS. 5A, 5B, and 5C, are side prospective views illustrating attaching a diaphragm assembly to a bonnet assembly of a diaphragm valve;

FIG. 6, including

FIG. 7, including

DETAILED DESCRIPTION

Figure 1:
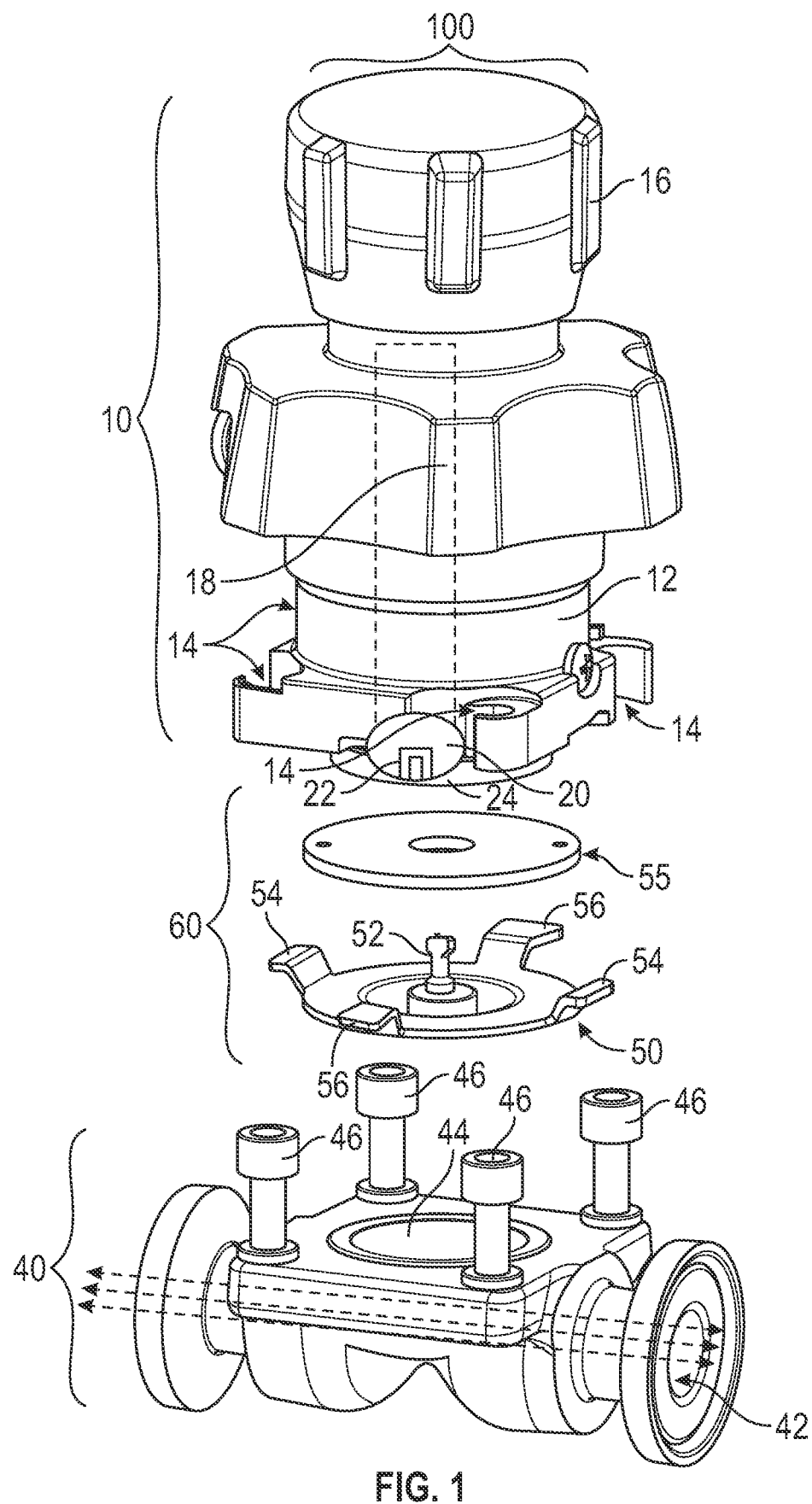
FIG. 1 is a side view illustrating a diaphragm valve including a bonnet assembly, a body assembly, and a diaphragm assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a side view illustrating a diaphragm valve including a bonnet assembly, a body assembly, and a diaphragm assembly, arranged in accordance with at least some embodiments described herein. Diaphragm valve 100 may include a bonnet assembly 10, a body assembly 40, and a diaphragm assembly 60. Bonnet assembly 10 may include a housing 12, a handwheel 16, a threaded valve stem 18 threadedly engaged within a threaded opening defined by housing 12 within bonnet assembly 10, and a compressor 20. Housing 12 may include a peripheral sealing flange 24. Housing 12 may further define keyholes 14. Handwheel 16 may be attached at a first end of threaded valve stem 18 and compressor 20 may be attached at a second end of threaded valve stem 18. Compressor 20 may include a connector 22 that is available for coupling. Connector 22 may be part of compressor 20 such that connector 22 is an open aperture available for threaded coupling. Connector 22 may be a tube nut and may have a sliding, axial connection to compressor 20 with a shoulder which engages compressor 20 and an open aperture available for threaded coupling. Connector 22 may be a slot which allows an unthreaded cylindrical stud with a cross pin or a metal stud to engage and connect to compressor 20.

Body assembly 40 may define a fluid passageway 42. Body assembly 40 may include a weir 44. Weir 44 may be positioned within fluid passageway 42 and may cooperate with diaphragm assembly 60 to control a flow of fluid through fluid passageway 42. Body assembly 40 may include body studs 46. Body studs 46 may align with keyholes 14 defined by housing 12 of bonnet assembly 10. Keyholes 14 and bonnet assembly 10 may be positioned around body studs 46 and rotated around a primary axis of diaphragm valve 100 to attach bonnet assembly 10 to body assembly 40.

Diaphragm assembly 60 may include a diaphragm 50 and a backing cushion 55. Diaphragm 50 may include a diaphragm stud 52 and diaphragm tabs 54 and 56. Diaphragm stud 52 may be embedded in a central boss of diaphragm 50 and may be configured to couple with open aperture end of connector 22. Diaphragm stud 52 may be a threaded stud, an unthreaded cylindrical stud with a cross pin or a metal stud. Backing cushion 55 may have a disc shape and material of backing cushion 55 may define a small aperture through the middle of backing cushion 55. Diaphragm stud 52 may insert through the small aperture defined by backing cushion 55 and into connector 22 such that backing cushion may be sandwiched between diaphragm 50 and flange 24 of bonnet housing 12. As explained in more detail below, diaphragm assembly 60 may be positioned within diaphragm valve 100 based on diaphragm stud 52 and may further be positioned due to diaphragm tabs 54 and 56 aligning with bonnet housing 12.

Figure 2:
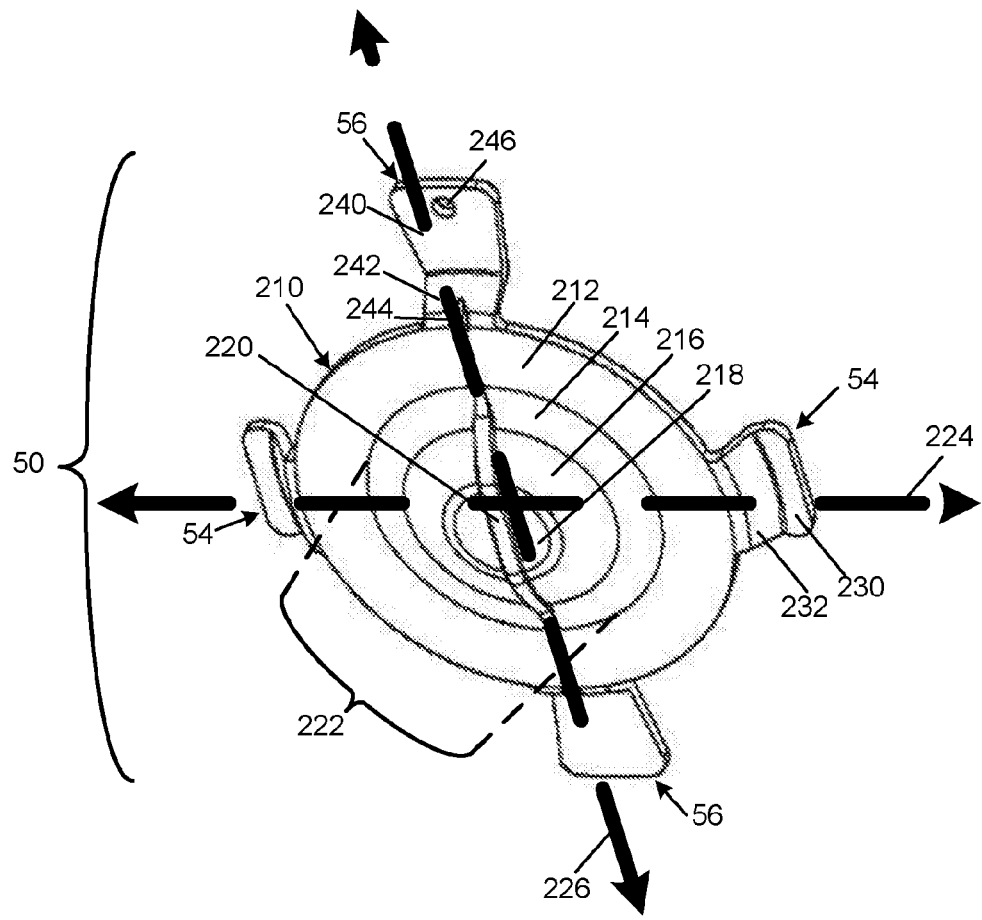
FIG. 2 is a bottom perspective view illustrating a diaphragm.

FIG. 2 is a bottom perspective view illustrating diaphragm 50, arranged in accordance with at least some embodiments presented herein. Those components in FIG. 2 that are labeled identically to components of FIG. 1 will not be described again for the purposes of brevity. Diaphragm 50 may be comprised of polytetrafluoroethylene (PTFE) Diaphragm 50 may comprise a disc shaped structure 210 which may have a top side and bottom side. The top side of structure 210 and the bottom side of structure 210 may each have a circular outline or a non-circular outline. A portion of the bottom side of structure 210 of diaphragm 50 may protrude outward in a bowl 222 around a center disc 218 of structure 210 when view at a side profile. In some examples, bowl 222 may be a portion of a sphere such as a spherical dome. In another example, bowl 222 of circular shaped structure 210 may be defined by rings 212, 214, 216, and disc 218. Ring 212 may be an outermost ring of structure 210 and may have an essentially flat profile. Bowl 222 may project outward from flat ring 212 at ring 214 and continue to slope outward to ring 216 so that ring 214 forms a conical frustum. Disc 218 may be essentially flat in profile and may be essentially parallel in profile to ring 212. Bowl 222 may essentially be formed by rings 214 and 216 sloping between flat profile outer ring 212 and flat profile disc 218.

Diaphragm 50 may also include a diaphragm bead 220. Diaphragm bead 220 may be located on the bottom side of diaphragm structure 210 and may be along axis 226. Diaphragm bead 220 may provide an improved seal between diaphragm 50 and weir 44 (FIG. 1) when diaphragm 50 is engaged with weir 44. In another embodiment, diaphragm 50 may include a peripheral bead on a bottom side of outer ring 212 to aid in periphery seal.

Diaphragm 50 may further include at least one tab 54 or tab 56. Diaphragm tabs 54 and 56 may extend radially out from outer ring 212 and structure 210. Tabs 54 may extend radially from outer ring 212 along a first axis 224 and tabs 56 may extend radially from outer ring 212 along a second axis 226. First axis 224 may be perpendicular to second axis 226 and may intersect second axis 226 at a central point of ring 212.

Tabs 54 and tabs 56 may be formed by cutting tabs 54 and tabs 56 from radially rotated features of diaphragm 50 when diaphragm 50 is formed. Tabs 54 may include a tab end 230 and a tab connector 232. Tab end 230 may be essentially flat in profile and essentially parallel in profile to ring 212 and disc 218. Tab connector 232 may include a first side and a second side. First side of tab connector 232 may be connected to tab end 230 and second side of tab connector 232 may be connected to ring 212. Tab connector 232 may slope between flat profile outer ring 212 and flat profile tab end 230.

Tabs 56 may include a tab end 240, a tab connector 242, and a tab notch 244. Tab end 240 may be essentially flat in profile and essentially parallel in profile to ring 212 and disc 218. Tab connector 242 may include a first side and a second side. First side of tab connector 242 may be connected to tab end 240 and second side of tab connector 242 may be connected to ring 212. Tab connector 242 may slope between flat profile outer ring 212 and flat profile tab end 240. Tab end 240 may extend radially from outer ring 212 and tab connector 242. Tab connector 242 may define a tab notch 244. Tab notch 244 may be a 90 degree vertical notch in tab connector 242 at an end of tab connector 242 which is connected to ring 212. Tab notch 244 may add structural stability to tabs 56. Tab ends 240 may be longer in length than tab ends 230. Tab ends 240 may have a different width than tab ends 230. One of tab ends 240 may include walls defining an opening 246.

Figure 3:
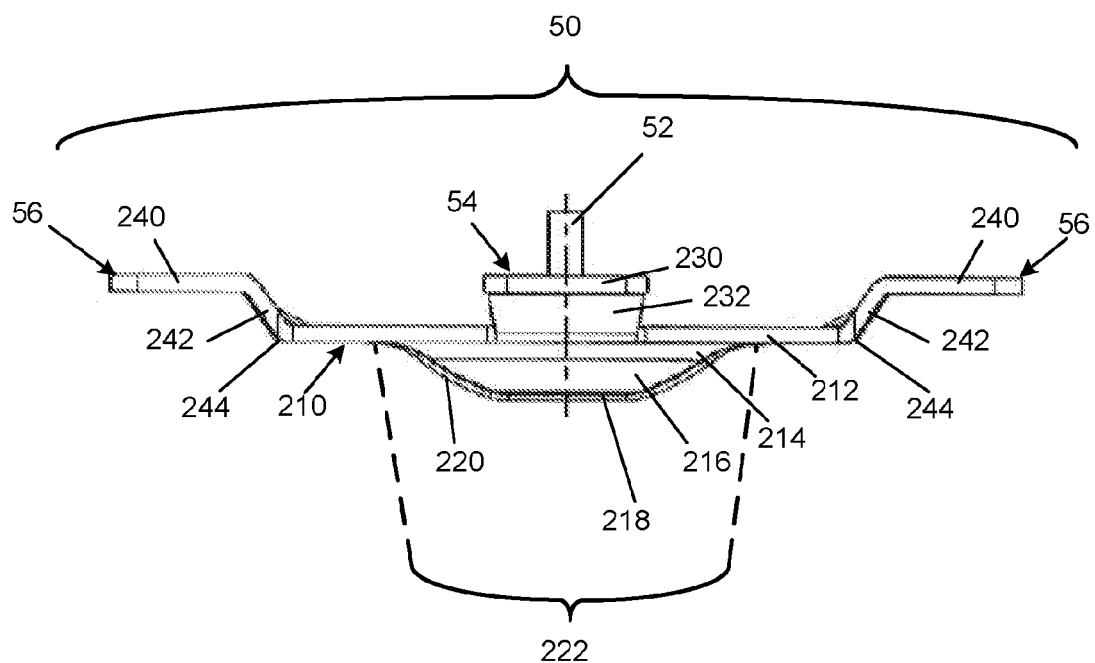
FIG. 3 is a side cutaway view of a diaphragm.

FIG. 3 is a side cutaway view of diaphragm 50, arranged in accordance with at least some embodiments presented herein. Those components in FIG. 3 that are labeled identically to components of FIGS. 1-2 will not be described again for the purposes of brevity. As shown in side cutaway view of diaphragm 50 of FIG. 3, outer ring 212, disc 218, and tab ends 240 may each be essentially flat in profile and may each be essentially parallel in profile with respect to each other. In FIG. 3, bowl 222 may be formed by rings 214 and 216 protruding outward and downward from flat profile of outer ring 212 and connecting to flat profile of disc 218.

Figure 4:
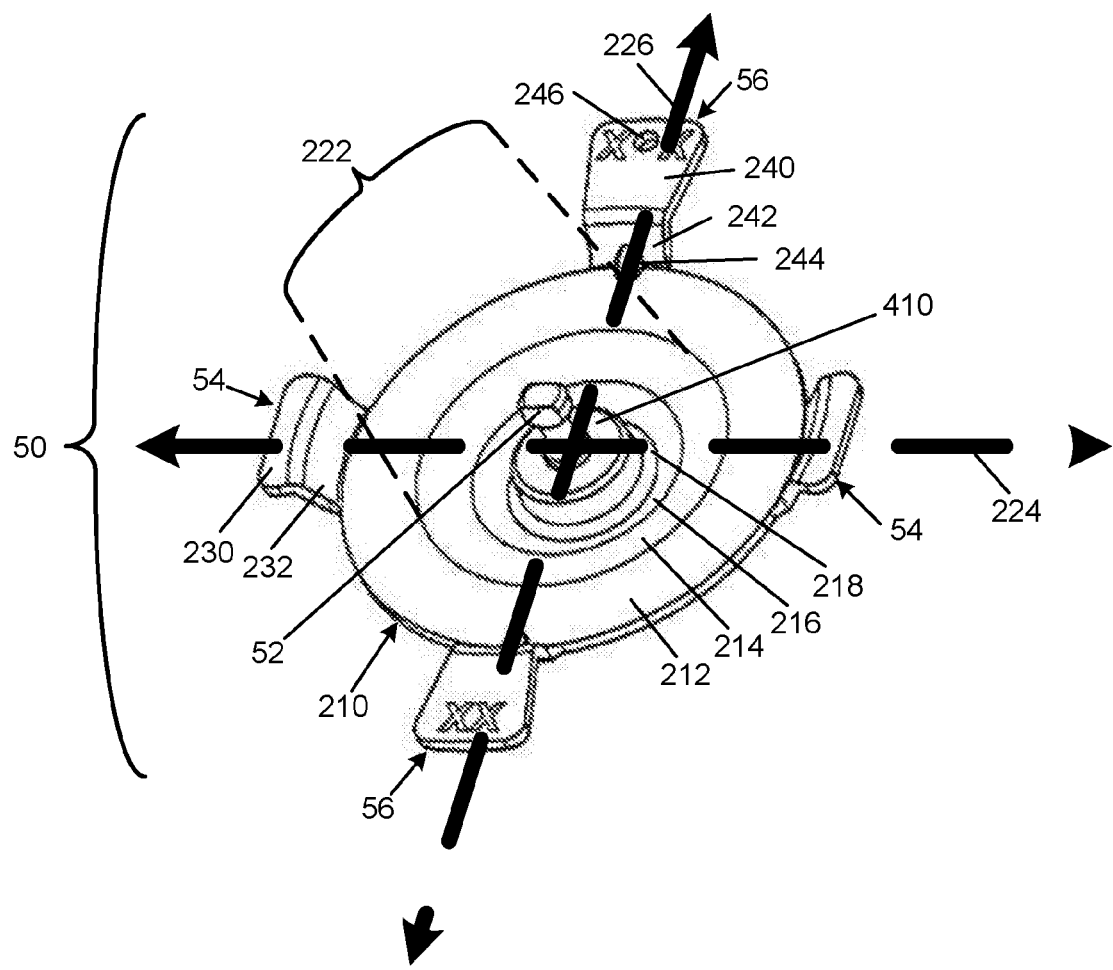
FIG. 4 is a top perspective view of a diaphragm.

FIG. 4 is a top perspective view of diaphragm 50, arranged in accordance with at least some embodiments presented herein. Those components in FIG. 4 that are labeled identically to components of FIGS. 1-3 will not be described again for the purposes of brevity. Diaphragm stud 52 may be on a top side of diaphragm 50, may be located at a center point of structure 210 and disc 218, and may extend perpendicular to profile of structure 210 and disc 218. Disc 218 may include a disc base 410 which may secure a first end of diaphragm stud 52 to disc 218 and diaphragm structure 210. A second end of diaphragm stud 52 may be configured to couple with open aperture end of connector 22 (FIG. 1).

FIG. 5, including FIGS. 5A, 5B, and 5C, are a side perspective views illustrating attaching a diaphragm assembly to a bonnet assembly of a diaphragm valve, arranged in accordance with at least some embodiments described herein. Those components in FIGS. 5A-5C that are labeled identically to components of FIGS. 1-4 will not be described again for the purposes of brevity.

As shown at FIG. 5A, system 500 may include bonnet assembly 10, including handwheel 16, and diaphragm assembly 60. Diaphragm assembly 60 may include diaphragm 50 and backing cushion 55. Backing cushion 55 may include elastomer compounds such as those made with ethylene propylene diene terpolymer (EPDM), silicone, flueroelastomer (FKM). Backing cushion 55 may be placed on a top side of diaphragm 50 such that diaphragm stud 52 may insert through the small aperture defined by backing cushion 55 and backing cushion 55 is in contact with top side of ring 212. Bonnet assembly 10 may include walls defining bonnet notches 510A and 510B. Walls of bonnet assembly 10 may define width of bonnet notches 510A with a different width than bonnet notches 510b. Bonnet assembly 10 may include open aperture end of connector 22. Diaphragm assembly 60 may be positioned so that diaphragm stud 52 may couple with open aperture end of connector 22 of bonnet assembly 10. Diaphragm stud 52 may be inserted into open aperture end of connector 22 when diaphragm stud 52 is at a first alignment relative to open aperture end of connector 22.

As shown at FIG. 5B, diaphragm assembly 60 may be inserted or threaded with respect to bonnet assembly so as to couple diaphragm stud 52 (not shown) with open aperture end of connector 22 (not shown) of bonnet assembly 10.

As shown at FIG. 5C, diaphragm assembly 60 may be aligned with bonnet assembly 10. At least one diaphragm tab 54 or 56 may be aligned with a bonnet notch 510A and/or 510B. Diaphragm assembly 60 may be pressed against bonnet assembly 10. At least one tab end 230 or 240 of diaphragm tabs 54 or 56 respectively may engage with at least one bonnet notch 510A or 510B to secure diaphragm assembly 60 to bonnet assembly 10. At least one tab end 230 or 240 of diaphragm tabs 54 and 56 respectively may engage with at least one bonnet notch 510 such that diaphragm 50 may be fixed rotationally with respect to bonnet housing 12. In one embodiment, diaphragm 50 may include two diaphragm tabs 54 and two diaphragm tabs 56. Walls of bonnet assembly 10 may define width of bonnet notches 510A similar to width of tab ends 230 so that tab ends 230 fit within bonnet notches 510A. Walls of bonnet assembly 10 may define width of bonnet notches 510b similar to width of tab ends 240 so that tab ends 240 fit within bonnet notches 510B. Tab ends 230 of diaphragm tabs 54 may not engage with bonnet notches 510b and/or tab ends 240 of diaphragm tabs 56 may not engage with bonnet notches 510A. Tab ends 230 of diaphragm tabs 54 may engage with bonnet notches 510A and tab ends 240 of diaphragm tabs 56 may engage with bonnet notches 510B to secure diaphragm assembly 60 to bonnet assembly 10 with a correct orientation of diaphragm bead 220. Tab ends 240 may be longer than bonnet notches 510 and may extend out radially from bonnet notches 510. Tab ends 240 extending out radially from bonnet notches 510 may indicate a positioning of diaphragm 50 and diaphragm bead 220 such as an alignment of diaphragm 50 and diaphragm bead 220 relative to bonnet assembly 10. Backing cushion 55 may be secured between diaphragm 50 and bonnet housing 12.

Figure 6B:
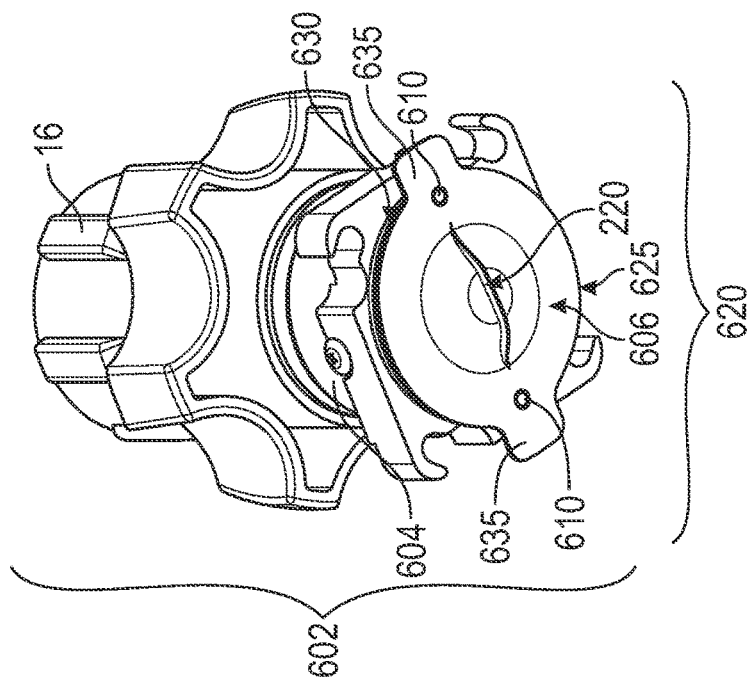
FIGS. 6A and 6B, are side prospective views illustrating attaching a diaphragm assembly to a bonnet assembly.
Figure 6A:
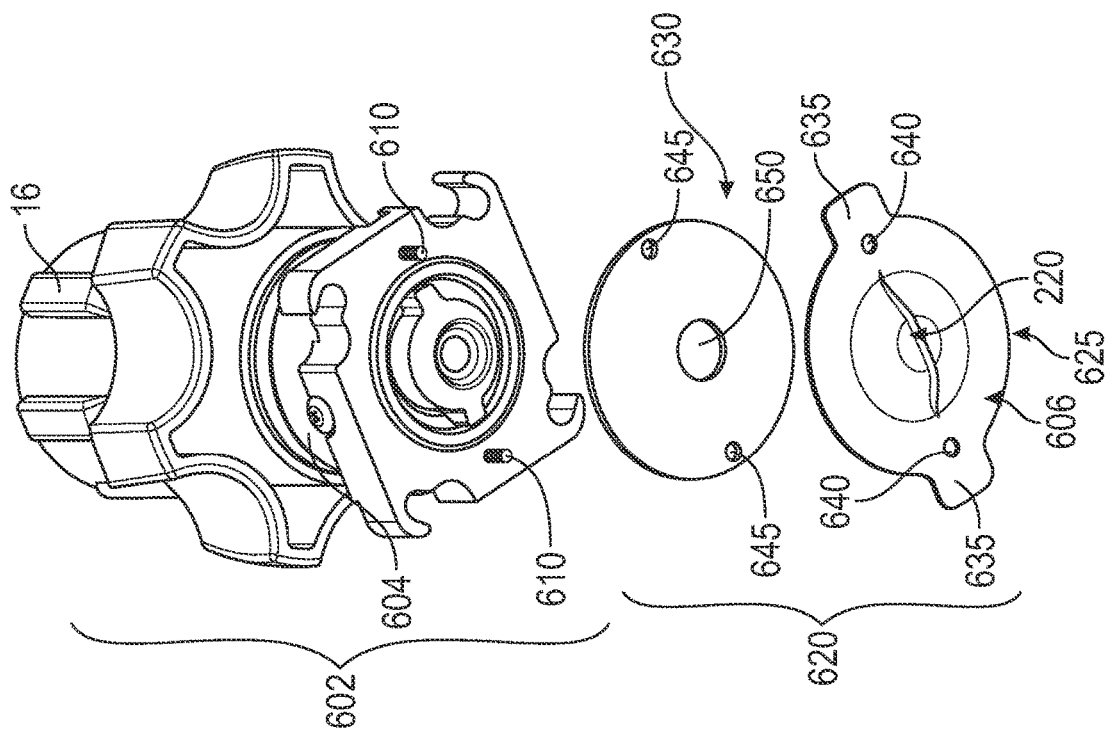

FIG. 6, including FIGS. 6A and 6B, are side prospective views illustrating attaching a diaphragm assembly to a bonnet assembly, arranged in accordance with at least some embodiments described herein. Those components in FIGS. 6A-6B that are labeled identically to components of FIGS. 1-5 will not be described again for the purposes of brevity.

As shown at FIG. 6A, in another embodiment, diaphragm assembly 620 may include a diaphragm 625 and a backing cushion 630. Bonnet assembly 602 may include bonnet housing 604. Diaphragm 625 may be comprised of polytetrafluoroethylene (PTFE). Diaphragm 625 may comprise a formed disc with circular shaped structure 606 when viewed from below. Structure 606 of diaphragm 625 may protrude outward in a bowl shape as previously described. Diaphragm 625 may also include diaphragm bead 220. Diaphragm bead 220 may be on a bottom surface of diaphragm structure 606 and may be on an axis from a center point of structure 606.

Diaphragm 625 may further include tabs 635 protruding radially out from structure 606. Tabs 635 may protrude radially from structure 606 along the same orthogonal axis as diaphragm bead 220 and may be in a same profile plane as structure 606. Structure 606 and tabs 635 may define diaphragm alignment holes 640 through diaphragm 625.

Material of backing cushion 630 may define holes 645 through backing cushion 630. Backing cushion 630 may be placed on a top side of diaphragm 625 such that a diaphragm stud 52 (not shown) may insert through a small aperture 650 defined by backing cushion 630 and holes 645 defined by backing cushion 630 are aligned with diaphragm alignment holes 640 defined by structure 606 and tabs 635. Bonnet assembly 602 may include one or more bonnet pins 610. One or more bonnet pins 610 may protrude from bonnet housing 604.

As shown at FIG. 6B, one or more bonnet pins 610 may engage with one or more backing cushion holes 645 and one or more diaphragm alignment holes 640. One or more bonnet pins 610 engaged with one or more backing cushion holes 645 and one or more diaphragm alignment holes 640 may align diaphragm assembly 620 to bonnet assembly 602 when diaphragm assembly 620 is attached to bonnet assembly 602.

Figure 7B:
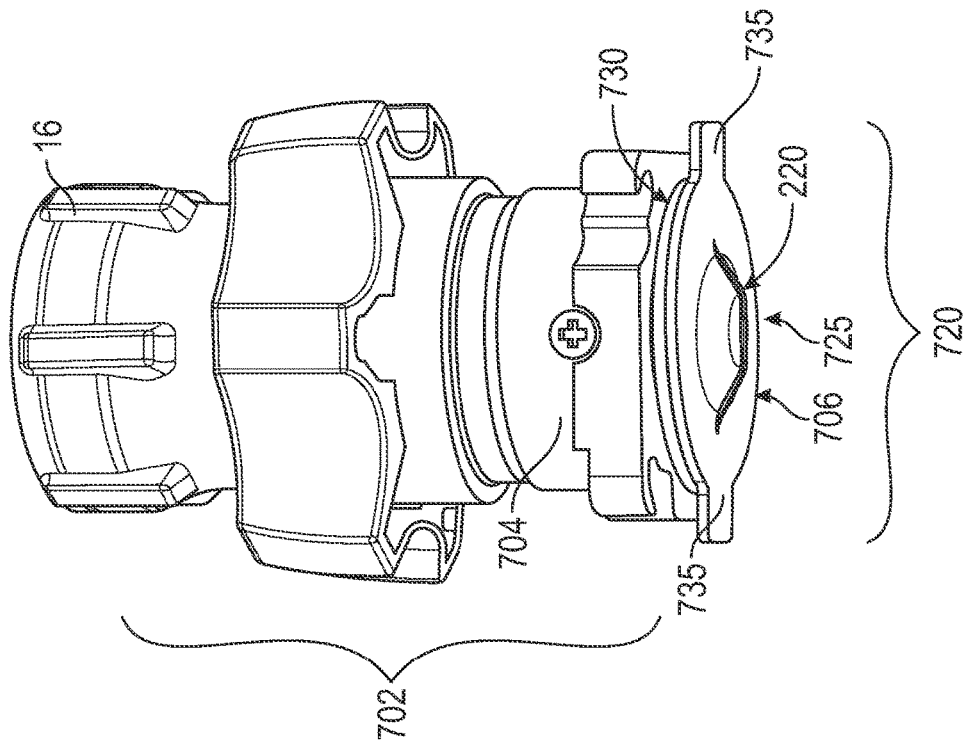
FIGS. 7A and 7B, are side prospective views illustrating attaching a diaphragm assembly to a bonnet assembly.
Figure 7A:
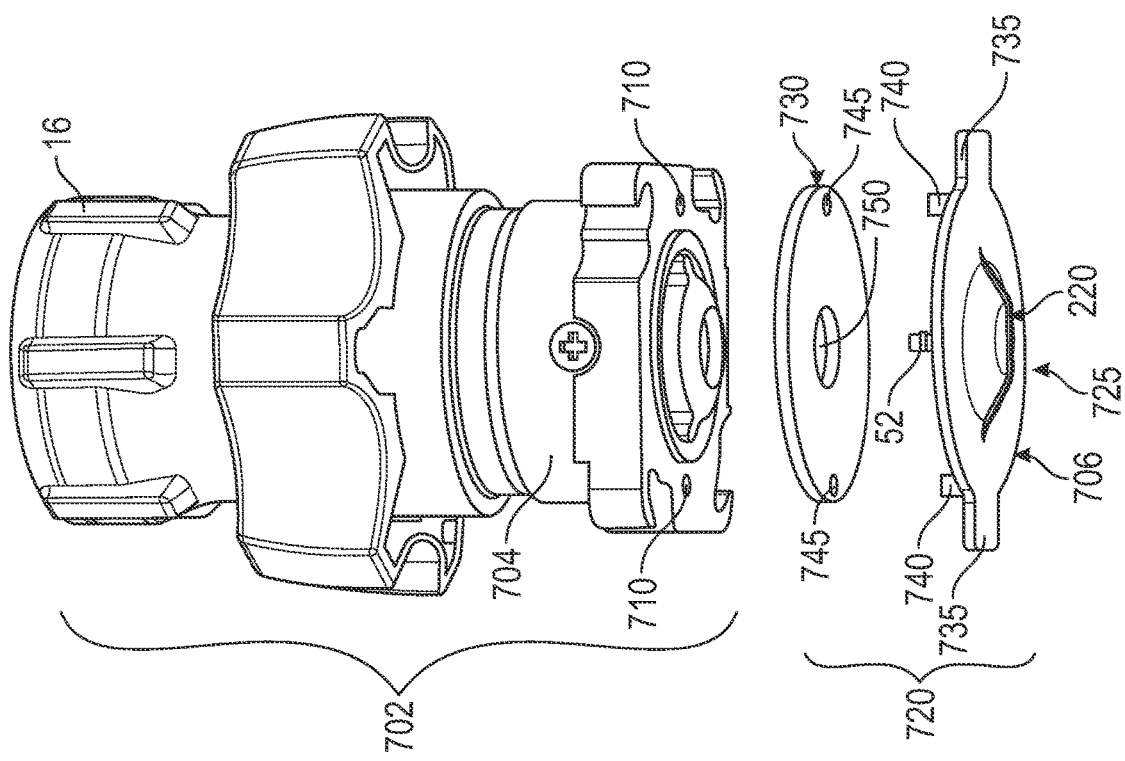

FIG. 7, including FIGS. 7A and 7B, are side prospective views illustrating attaching a diaphragm assembly to a bonnet assembly, arranged in accordance with at least some embodiments described herein. Those components in FIGS. 7A-7B that are labeled identically to components of FIGS. 1-6 will not be described again for the purposes of brevity.

As shown at FIG. 7A, in another embodiment, diaphragm assembly 720 may include a diaphragm 725 and a backing cushion 730. Bonnet assembly 702 may include bonnet housing 704. Diaphragm 725 may be comprised of polytetrafluoroethylene (PTFE), otherwise known as TEFLON. Diaphragm 725 may comprise a formed disc with circular shaped structure 706 when viewed from below. Structure 706 of diaphragm 725 may protrude outward in a bowl shape as previously described. Diaphragm 725 may also include diaphragm bead 220. Diaphragm bead 220 may be on a bottom surface of diaphragm structure 706 and may be on an orthogonal axis from a center point of structure 706.

Diaphragm 725 may further include tabs 735 protruding radially out from structure 706. Tabs 735 may protrude radially from structure 706 along the same orthogonal axis as diaphragm bead 220 and may be in a same profile plane as structure 706. Diaphragm 725 may further include one or more diaphragm alignment pins 740. One or more diaphragm alignment pins 740 may protrude upward from top side of structure 706.

Material of backing cushion 730 may define one or more holes 745 through backing cushion 730. Backing cushion 730 may be placed on a top side of diaphragm 725 such that diaphragm stud 52 may insert through a small aperture 750 defined by backing cushion 730 and one or more diaphragm alignment pins 740 may insert through one or more holes 745 defined by backing cushion 730. Bonnet assembly 702 may include one or more bonnet alignment orifices 710.

As shown at FIG. 7B, one or more diaphragm alignment pins 740 may engage with one or more bonnet alignment orifices 710 when diaphragm assembly 720 is attached to bonnet assembly 702. One or more diaphragm alignment pins 740 engaged with one or more bonnet alignment orifices 710 may align diaphragm assembly 720 to bonnet assembly 702 when diaphragm assembly 720 is attached to bonnet housing 704.

A device in accordance with the present disclosure may provide a diaphragm assembly with improved alignment of the diaphragm bead to a weir of a body assembly. A device in accordance with the present disclosure may provide a diaphragm assembly which may be aligned to a bonnet assembly and not to body bolts, allowing a use of body studs and bonnet keyways. A device in accordance with the present disclosure may provide a diaphragm assembly which may be aligned to a bonnet assembly without a complicated backing cushion with features to interlock with the bonnet assembly and other features to interlock with the diaphragm. A device in accordance with the present disclosure may provide a backing cushion for a diaphragm assembly which may be manufactured by molding and cutting rather than molding and bending. A device in accordance with the present disclosure may provide a diaphragm which aligns with a bonnet assembly and does not utilize an intermediary structure to facilitate alignment.

Figure 8:
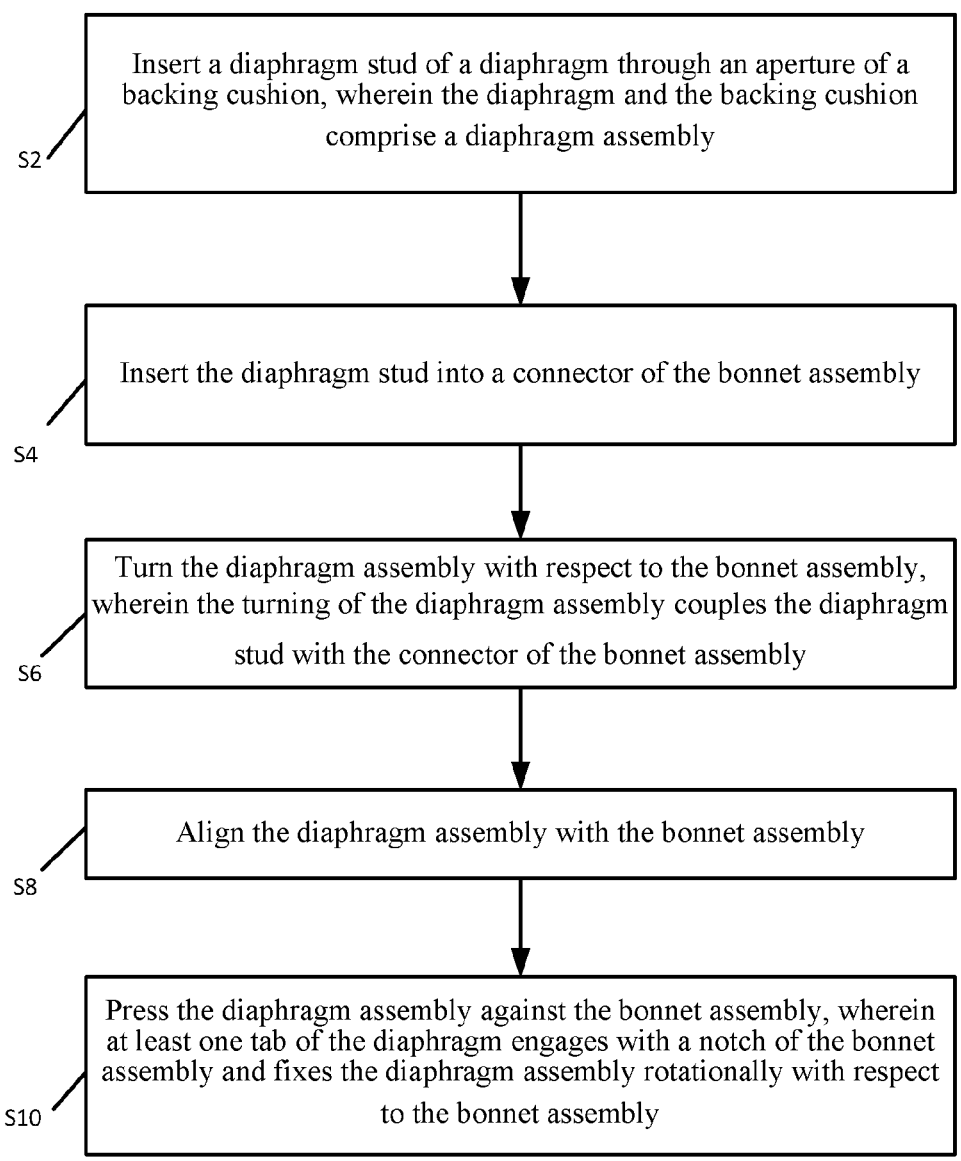
FIG. 8 illustrates a flow diagram for an example process to attaching a diaphragm assembly to a bonnet assembly; all arranged according to at least some embodiments described herein.

FIG. 8 illustrates a flow diagram for an example process to attaching a diaphragm assembly to a bonnet assembly, arranged in accordance with at least some embodiments presented herein. The process in FIG. 8 could be implemented using, for example, system 500 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Insert a diaphragm stud of a diaphragm through an aperture of a backing cushion, wherein the diaphragm and the backing cushion comprise a diaphragm assembly". At block S2, the diaphragm stud of a diaphragm may be inserted through an aperture of a backing cushion. The diaphragm and the backing cushion may comprise a diaphragm assembly.

Processing may continue from block S2 to block S4, "Insert the diaphragm stud into a connector of the bonnet assembly". At block S4, the diaphragm stud may be inserted into a connector of the bonnet assembly.

Processing may continue from block S4 to block S6, "Turn the diaphragm assembly with respect to the bonnet assemble, wherein the turning of the diaphragm assembly couples the diaphragm stud with the connector of the bonnet assembly". At block S6, the diaphragm assembly may be turned with respect to the bonnet assembly. The turning of the diaphragm assembly may couple the diaphragm stud with the connector of the bonnet assembly.

Processing may continue from block S6 to block S8, "Align the diaphragm assembly with the bonnet assembly". At block S8, the diaphragm assembly may be aligned with the bonnet assembly.

Processing may continue from block SB to block S10, "Press the diaphragm assembly against the bonnet assembly, wherein at least one tab of the diaphragm engages with a notch of the bonnet assembly and fixes the diaphragm assembly rotationally with respect to the bonnet assembly". At block S10, the diaphragm assembly may be pressed against the bonnet assembly. At least one tab of the diaphragm may engage with a notch of the bonnet assembly and fix the diaphragm assembly rotationally with respect to the bonnet assembly.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A diaphragm for a diaphragm valve, the diaphragm comprising:
   a structure, wherein the structure is a disc shape with a top side and a bottom side;
   a diaphragm stud at a center point on the top side of the structure, wherein the diaphragm stud is configured to couple with a connector of a bonnet assembly;
   first tabs, wherein the first tabs extend radially from the structure along a first axis of the structure at outer edges of the structure; and
   second tabs, wherein the second tabs extend radially from the structure along a second axis of the structure at outer edges of the structure, the second axis being perpendicular to the first axis, the first tabs and the second tabs engage with bonnet notches of the bonnet assembly to align the diaphragm to the bonnet assembly when the diaphragm is attached to the bonnet assembly and first tabs have a different width than the second tabs.

2. The diaphragm of claim 1, wherein the structure of the diaphragm is comprised of polytetrafluoroethylene (PTFE).

3. The diaphragm of claim 1, further comprising a diaphragm bead on the bottom side of the structure, wherein the diaphragm bead is along the first axis of the structure; and
   wherein the first tabs extend out radially from the bonnet notches and indicate an alignment of the diaphragm and the diaphragm bead relative to the bonnet assembly.

4. The diaphragm of claim 1, wherein the second tabs include a tab connector and a tab end, and wherein the tab end is connected to a first side of the tab connector and the structure is connected to a second side of the tab connector.

5. The diaphragm of claim 1, wherein a backing cushion is secured between the diaphragm and the bonnet assembly when the diaphragm is attached to the bonnet assembly.

6. The diaphragm of claim 5, wherein the backing cushion has a disc shape.

7. The diaphragm of claim 1, wherein the first tabs include a tab connector and a tab end, and wherein the tab end is connected to a first side of the tab connector and the structure is connected to a second side of the tab connector.

8. The diaphragm of claim 7, wherein the tab connector slopes from the structure to the tab end and the tab end extends radially from the tab connector and is parallel in profile with at least a portion of the structure.

9. The diaphragm of claim 7, wherein the tab connector defines a tab notch, and the tab notch is a notch in the tab connector.

10. A method of attaching a diaphragm to a bonnet assembly of a diaphragm valve, the method comprising:
    inserting a diaphragm stud of a diaphragm through an aperture of a backing cushion, wherein the diaphragm and the backing cushion comprise a diaphragm assembly;
    inserting the diaphragm stud into a connector of the bonnet assembly;
    turning the diaphragm assembly with respect to the bonnet assembly, wherein the turning of the diaphragm assembly couples the diaphragm stud with the connector of the bonnet assembly;
    aligning the diaphragm assembly with the bonnet assembly; and
    pressing the diaphragm assembly against the bonnet assembly, wherein the diaphragm includes first tabs and second tabs, at least one tab of the diaphragm engages with a notch of the bonnet assembly and fixes the diaphragm assembly rotationally with respect to the bonnet assembly, the first tabs are longer than the second tabs, and the first tabs extend out radially from the bonnet and indicate an alignment of the diaphragm and a diaphragm bead relative to the bonnet assembly.

11. The method of claim 10, further comprising, subsequent to attaching the diaphragm assembly to the bonnet assembly, connecting the diaphragm assembly and bonnet assembly to a body assembly to form a diaphragm valve.

12. The method of claim 11, wherein the diaphragm assembly engages with a weir of the body assembly to control a flow of fluid through a fluid passageway of the body assembly.

13. A diaphragm for a diaphragm valve, the diaphragm comprising:
    a structure, wherein the structure is a disc shape with a top side and a bottom side, the top side and the bottom side are circular in outline;
    a diaphragm stud at a center point on the top side of the structure, wherein the diaphragm stud is configured to couple with a connector of a bonnet assembly;
    tabs, wherein the tabs extend radially from the structure along an axis of the structure at outer edges of the structure, wherein the tabs and the structure define one or more diaphragm alignment holes or one or more diaphragm alignment pins; and
    a diaphragm bead on the bottom side of the structure, wherein the diaphragm bead is along the axis of the structure, and
    wherein the one or more diaphragm alignment holes engage with one or more bonnet alignment pins of the bonnet assembly to align the diaphragm to the bonnet assembly when the diaphragm is attached to the bonnet assembly or the one or more diaphragm alignment pins engage with one or more bonnet alignment orifices of the bonnet assembly to align the diaphragm to the bonnet assembly when the diaphragm is attached to the bonnet assembly and tabs extend out radially from the bonnet assembly and indicate an alignment of the diaphragm and the diaphragm bead relative to the bonnet assembly.

14. The diaphragm of claim 13, wherein the structure of the diaphragm is comprised of polytetrafluoroethylene (PTFE).

15. The diaphragm of claim 13, wherein the tabs extend radially from the structure in a same profile plane as the structure.

16. The diaphragm of claim 13, wherein a backing cushion is secured between the diaphragm and the bonnet assembly when the diaphragm is attached to the bonnet assembly.

17. The diaphragm of claim 13, wherein the backing cushion has a disc shape.

* * * * *